(12) United States Patent
Graham et al.

(10) Patent No.: US 7,467,410 B2
(45) Date of Patent: *Dec. 16, 2008

(54) SYSTEM AND METHOD FOR PREVENTING NETWORK MISUSE

(75) Inventors: Robert David Graham, Menlo Park, CA (US); Peter Kavaler, Castro Valley, CA (US)

(73) Assignee: International Business Machines Corporation, Armonk, NY (US)

( * ) Notice: Subject to any disclaimer, the term of this patent is extended or adjusted under 35 U.S.C. 154(b) by 95 days.

This patent is subject to a terminal disclaimer.

(21) Appl. No.: 11/749,040

(22) Filed: May 15, 2007

(65) Prior Publication Data

US 2007/0214088 A1   Sep. 13, 2007

Related U.S. Application Data

(63) Continuation of application No. 09/874,574, filed on Jun. 4, 2001, now Pat. No. 7,237,264.

(51) Int. Cl.
    *H04L 29/00* (2006.01)
(52) U.S. Cl. .......................................... 726/23; 726/25
(58) Field of Classification Search ................. 709/225, 709/223; 713/201, 200; 726/25, 23
    See application file for complete search history.

(56) References Cited

U.S. PATENT DOCUMENTS

| 5,991,881 | A  | 11/1999 | Conklin et al. |
|---|---|---|---|
| 6,275,942 | B1 | 8/2001 | Bernhard et al. |
| 6,279,113 | B1 | 8/2001 | Vaidya |
| 6,301,668 | B1 | 10/2001 | Gleichauf et al. |
| 6,460,141 | B1 | 10/2002 | Olden |
| 6,728,886 | B1 | 4/2004 | Ji et al. |
| 2002/0083331 | A1 | 6/2002 | Krumel |

OTHER PUBLICATIONS

Mark Crosbie, Gene Spafford, "*Active Defense of a Computer System using Autonomous Agents*," Coast Group Dept. of Computer Sciences Purdue, 1995, n95-008, "citeseer.ist.psu.edu/138521.html", pp. 2-4.

Jakobson, G.; Weissman, M., "*Alarm correlation*," Network, IEEE, vol. 7, Issue 6, Nov. 1993, pp. 52-59.

Debra Anderson, Thane Frivold, Alfonso Valdes, "*Next-generation Intrusion Detection Expert System (NIDES) A Summary*," Computer Science Laboratory; SRI-CSL-95-07, May 1995, pp. 11-13.

Denning, D.E., "*An Intrusion-Detection Model*," Software Engineering, IEEE Transactions on, vol. SE-13, Issue 2, Feb. 1987, pp. 222-232.

(Continued)

*Primary Examiner*—Andrew L Nalven
(74) *Attorney, Agent, or Firm*—King & Spalding LLP

(57) ABSTRACT

A system and method for preventing misuse conditions on a data network are described. Embodiments of the system and method evaluate potential network misuse signatures by analyzing variables such as the state of the network and/or target, the context in which the potential misuse signatures are detected, the response/reaction of the target and/or the fingerprint of the target. These and other variables may be factored in to the misuse determination, either alone, or in combination.

20 Claims, 12 Drawing Sheets

OTHER PUBLICATIONS

Steven Ray Snapp, "*Signature Analysis and Communication Issues in a Distributed Intrusion Detection System*," Masters Thesis, Department of Computer Science, University of California, Davis CA 95616, 1991, pp. 25-36.

Teng, H.S. Chen, K. Lu, S.C., "*Adaptive real-time anomaly detection using inductively generated sequential patterns*," Research in Security and Privacy, 1990. Proceedings., 1990 IEEE Computer Society Symposium on May 7-9, 1990, pp. 278-284.

Munson, J.C.; Wimer, S., "*Watcher: the missing piece of the security puzzle*," Computer Security Applications Conference, 2001, ACSAC 2001, Proceedings 17th Annual, Dec. 10-14, 2001, pp. 230-239.

Phillip A. Porras, Martin W. Fong and Alfonso Valdes, "*Mission-Impact-Based Approach to (INFOSEC) Alarm Correlation*," Lecture Notes in Computer Science, Proceedings Recent Advances in Intrusion Detection, Oct. 2002, pp. 1-18.

Frédéric Cuppens, "*Cooperative intrusion detection*," ONERA Centre de Toulouse (funded by the DGA/CASSI), pp. 1-10.

Mukherjee, B., Heberlein, L.T., Levitt, K.N., "*Network intrusion detection*," IEEE Network Magazine: May/Jun. 1994, vol. 8, Issue: 3, pp. 26-41.

Sandeep Kumar, Eugene H. Spafford, "*An Application of Pattern Matching in Intrusion Detection*," Technical Report 94-013, Department of Computer Sciences, Purdue University, Mar. 1994, http://citeseer.ist.psu.edu/kumar94application.html, pp. 1-55.

Y. Frank Jou, et al., "*Architecture Design of a Scalable Intrusion Detection System for the Emerging network Infrastructure*," DARPA Order No. E296, Apr. 1997, http://citeseer.ist.psu.edu/jou97architecture.html, pp. 1-36, reference p. 5.

Forlanda, "*The Secrets to Driving on BlackIce*," Jan. 12, 2000, Network Ice, pp. 1-32.

"*BlackIce User's Guide Version 1.0 Beta Draft*," 1999, Network Ice Corporation, pp. 1-55.

Shulak et al., "*Icecap Advanced Administration Guide Version 3.0*," 2001, Internet Security Systems Corporation, pp. 1-44.

"*RealSecure™, Network Engine User Guide*," Version 3.2.1, © 1999 by Internet Security Systems, Inc., pp. 1-28.

"*RealSecure Version 2.0*," Apr. 1998, pp. 1-145.

"*RealSecure Network Sensor and Gigabit Network Sensor Policy Guide Version 7.0*", Aug. 2003, pp. 1-76.

Kosoresow, A.P.; Hofmeyer, S.A., "*Intrusion detection via system call traces*," Software, IEEE, vol. 14, Issue 5, Sep.-Oct. 1997, pp. 35-42.

Rik Farrow, "*Security Reality Check*," Network Magazine, Jul. 1, 1999, 4 pgs.

Steve Steinke, "*Firewalls*," Dr. Dobb's Journal Vendor Perspectives Netseminar, Jun. 14, 2000, 5-pgs.

Yin Zhang et al., "*Detecting Backdoors*," Feb. 19, 1998.

Contextual Information for Data Signature Evaluation

| Data Signature | Context | Severity/Alert Condition (0-5) |
|---|---|---|
| "/cgi-bin/phf" | HTTP URL | 4 |
| "/cgi-bin/phf" | Email header | 0 |
| "/cgi-bin/phf" | HTML HREF | 3 |
| ".exe" | TFTP filename | 2 |

FIG. 4

Exemplary Fingerprint Requests and Target Responses

FTP (file transfer):
    220 rh5.robertgraham.com FTP server (version wu-2.4.2-academ [BETA-15] (1) Sat Nov 1 03:08:32 EST 1997) ready.

Telnet
    Red Hat Linux release 5.0 (Hurricane)
    kernel 2.0.31 on an i486
    login:

SMTP (mail)
    220 rh5.robertgraham.com ESMTP Sendmail 8.8.7/8.8.7; Mon, 29 Nov 1999 23:28:31-0800

Finger (user information)
```
Login Name    Tty    Idle   Login Time     office     office
Phone
rob   Robert David Graham p0 Nov 29 22:51       (gandalf)
root  root                       p1 Nov 29 23:34
(10.17.128.201:0.0)
```

HTTP
    HTTP/1.0 200 OK
    Date: Tue, 30 Nov 1997 07:34:59 GMT
    Server: Apache/1.2.4
    Last-Modified: Thu, 06 Nov 1997 18:20:06 GMT
    Accept-Ranges: bytes
    Content-Length: 1928
    Content-Type: text/html HTTP
    Date: Fri, 01 Jun 2001 20:38:03 GMT
    Server: Apache/1.3.14 (Unix)  (Red-Hat/Linux) mod_ssl/2.7.1 OpenSSL/0.9.5a DAV/1.0.2 PHP/4.0.4pl1 mod_perl/1.24
    Last-Modified: Wed, 18 Oct 2000 22:31:33 GMT
    ETag: "9327c-b4a-39ee24c5"
    Accept-Ranges: bytes
    Content-Length: 2890
    Connection: close
    Content-Type: text/html POP3
    +OK  POP3  rh5.robertgraham.com  v4.39  server  ready IMAP
    * OK  rh5.robertgraham.com  IMAP4rev1  v10.190 server ready SMB
```
SMB: ----- Setup Account AndX Header -----
SMB:
SMB: Word count           = 3
SMB: Parameter words      = 750080000000
SMB: Byte Count           = 87
SMB: Byte parameters      = 00570069006E006400....
SMB: AndX command         = 75 (Tree Connect AndX)
SMB: AndX reserved(MBZ)   = 00
SMB: AndX offset          = 0080
SMB: Request Mode = 0000
SMB:  .... ....  .... ...0 = Not logged in as 'Guest'
SMB: Byte Count           = 87
SMB: Server's Native OS        = Windows NT 4.0
SMB: Server's Native LAN Man = NT LAN Manager 4.0
SMB: Server's Primary Domain = AMPHLETT
```

FIG. 5

Target Vulnerabilities

| Target Fingerprint | Data Signature (may be context-based) | Severity/Alert Condition (0-5) |
|---|---|---|
| OS: Apache Ver >= 1.2<br>Processor: any<br>BIOS: any | "/cgi-bin/phf" in HTTP Header | 0 |
| OS: Apache Ver < 1.2<br>Processor: any<br>BIOS: any | "/cgi-bin/phf" in HTTP Header | 4 |
| OS: IIS<br>Processor: any<br>BIOS: any | "/cgi-bin/phf" in HTTP Header | 0 |
| OS: Netscape Enterprise Server<br>Processor: any<br>BIOS: any | "/cgi-bin/phf" in HTTP Header | 0 |
| OS: any<br>Processor: Intel<br>BIOS: any | 09090909 | 3 |
| OS: any<br>Processor: Non-Intel<br>BIOS: any | 09090909 | 0 |

FIG. 6

220 mandrake.intra.networkice.com FTP server (Version wu-2.5.0(1) Sat May 22 11:15:07 GMT 1999) ready.

-> USER rob

331 Password required for rob.

-> PASS Cerveza2

230 User rob logged in.

-> SYS RETR /etc/passwd

500 'SYS RETR /etc/passwd': command not understood.

-> PORT 10,10,0,135,4,1

200 PORT command successful.

-> RETR /etc/passwd

150 Opening ASCII mode data connection for /etc/passwd (2661 bytes).

226 Transfer complete.

-> RNFR /etc/passwd

350 File exists, ready for destination name

-> RETR /tmp/etc/passwd

550 /tmp/etc/passwd: No such file or directory.

-> QUIT

221-You have transferred 2719 bytes in 1 files.

221-Total traffic for this session was 3397 bytes in 1 transfers.

221-Thank you for using the FTP service on mandrake.intra.networkice.com.

221 Goodbye.

FIG. 8

Excerpt from RFC 959

For each command or command sequence there are three
possible outcomes: success (S), failure (F), and error (E).
In the state diagrams below we use the symbol B for "begin",
and the symbol W for "wait for reply".

Snort 1.7 Signature

```
alert TCP $EXTERNAL any -> $INTERNAL 21 (
    msg: "IDS213/ftp_ftp-passwd-retrieval-retr";
    content: "RETR"; nocase;
    content: "passwd";)
```

Sample signature using one embodiment of the present system

```
alert TCP $EXTERNAL any -> $INTERNAL $FTP (
    msg: "IDS213/ftp_ftp-passwd-retrieval-retr";
    FTP.filename: "*/passwd";
    FTP.banner: "*Version wu-2*";
    FTP.response: "2??";
    FTP.response: "3??";
    )
```

FIG. 10

```
alert TCP $EXTERNAL any -> $INTERNAL $HTTP (
    msg: "system32/cmd.exe";
    HTTP.url: "*/system32/cmd.exe";
    HTTP.server: "IIS/*";
    +HTTP.response: "5??";
    -HTTP.response: "4??";
    -HTTP.response: "2??";
    )

alert TCP $EXTERNAL any -> $INTERNAL $HTTP (
    msg: "IIS malformed HTW";
    HTTP.url.extension: "*.htw";
    HTTP.server: "IIS/*";
    -HTTP.response: "5??";
    -HTTP.response: "4??";
    +HTTP.response: "2??";
    )
```

FIG. 11

```
RedHat 6.2
   program vers proto   port
    100000    2  tcp     111 portmapper
    100000    2  udp     111 portmapper
    100021    1  udp    1024 nlockmgr
    100021    3  udp    1024 nlockmgr
    100021    1  tcp    1024 nlockmgr
    100021    3  tcp    1024 nlockmgr
    100024    1  udp     980 status
    100024    1  tcp     982 status RedHat 7.0
   program vers proto   port
    100000    2  tcp     111 portmapper
    100000    2  udp     111 portmapper
    100021    1  udp    1024 nlockmgr
    100021    3  udp    1024 nlockmgr
    100024    1  udp    1025 status
    100024    1  tcp    1024 status Solaris 8
   program vers proto   port
    100000    4  tcp     111 portmapper
    100000    3  tcp     111 portmapper
    100000    2  tcp     111 portmapper
    100000    4  udp     111 portmapper
    100000    3  udp     111 portmapper
    100000    2  udp     111 portmapper
    100232   10  udp   32772 sadmind
    100011    1  udp   32773 rquotad
    100002    2  udp   32774 rusersd
    100002    3  udp   32774 rusersd
    100002    2  tcp   32771 rusersd
    100002    3  tcp   32771 rusersd
    100012    1  udp   32775 sprayd
    100008    1  udp   32776 walld
    100001    2  udp   32777 rstatd
    100001    3  udp   32777 rstatd
    100001    4  udp   32777 rstatd
    100024    1  udp   32778 status
    100021    1  udp    4045 nlockmgr
    100021    2  udp    4045 nlockmgr
    100021    3  udp    4045 nlockmgr
    100021    4  udp    4045 nlockmgr
    100024    1  tcp   32772 status
    100133    1  udp   32778
    100133    1  tcp   32772
    100083    1  tcp   32773
    100221    1  tcp   32774
    100235    1  tcp   32775
    100021    1  tcp    4045 nlockmgr
    100021    2  tcp    4045 nlockmgr
    100021    3  tcp    4045 nlockmgr
    100021    4  tcp    4045 nlockmgr
    100068    2  udp   32779
    100068    3  udp   32779
    100068    4  udp   32779
    100068    5  udp   32779
    300326    4  tcp   32776
    300598    1  udp   32786
    300598    1  tcp   32778
 805306368    1  udp   32786
 805306368    1  tcp   32778
    100249    1  udp   32787
    100249    1  tcp   32779
 1289637086   5  tcp   32803
 1289637086   1  tcp   32803
```

FIG. 12

SYSTEM AND METHOD FOR PREVENTING NETWORK MISUSE

CROSS REFERENCE TO RELATED APPLICATION

This application is a continuation of U.S. application Ser. No. 09/874,574 filed Jun. 4, 2001 now U.S. Pat. No. 7,237,264, entitled, "System and Method for Preventing Network Misuse", the entire contents of which are hereby incorporated by reference.

BACKGROUND OF THE INVENTION

1. Field of the Invention

This invention relates to data network management. More particularly, the invention relates to an improved system and method for analyzing and preventing unauthorized use of data network resources.

2. Description of the Related Art

The rapid increase in the use of data networks by both corporations and private organizations has created a need for improved security and network management techniques. Organizations today store substantial amounts of confidential information on network servers and workstations including trade secrets, marketing strategies, financial documents, and classified technical-information. The disclosure of such information to the public would, in most instances, cause severe damage to the organization.

In addition to the danger of confidential information being read out from the network, there is also a danger of unwanted information being written to the network. For example, with a working knowledge of how to evade currently available security systems, computer hackers (i.e., unauthorized users) are capable of crashing network servers and workstations, corrupting valuable data, and uploading computer viruses to the network. As such, organizations are forced to spend millions of dollars each year in an attempt to prevent this type of data network intrusion.

One system for handling a type of network misuse is commonly referred to as a "firewall." Firewalls are generally situated between a local area network (hereinafter "LAN") and all other external networks (e.g., the Internet). The firewall analyzes all incoming and outgoing digital information and makes a decision as to whether the information should be passed through or discarded. The firewall uses one or more algorithms provided by a network administrator to perform this analysis. For example, a network administrator may configure tables listing acceptable source and destination addresses for network traffic. Traffic addressed to an unlisted source or destination will be filtered out and discarded by the firewall.

Firewalls provide insufficient protection against computer hackers for a variety of reasons. One major reason is that firewalls only protect LANs from the outside world whereas the threat posed by computer hackers is not merely external. In fact, the majority of potential computer hackers are internal computer users, most of who already have access to the LAN. Although an individual user will typically be provided only limited access to LAN resources, the user may fraudulently acquire access to additional resources by misappropriating other users' passwords (or using other known computer hacking techniques).

A second problem associated with firewalls is that they are static in nature, requiring continuous updates by network administrators to work properly. If a computer hacker obtains the information necessary to break through the firewall (i.e., information needed to disguise his data as data originating from a legitimate source) he will acquire access to resources on the LAN. Another significant problem with firewalls is that they exclude data in an overly simplistic fashion: data is either passed through or it is discarded. No additional analysis is performed on incoming or outgoing data to determine whether the originator of the data—who may be disguising himself to the firewall—is attempting to misuse resources on the LAN.

A third problem with firewalls is that they do little to protect against abuse of "public" access. A firewall is like a lock on the doors of a convenience store that is open 24-hours a day. The public must be allowed into the store in order to conduct business transactions, the firewall must allow both the public as well as hackers, and can do little to detect or defend against the hackers masquerading as normal members of the public.

One technique used to augment the limited scope of protection provided by firewalls has been referred to as "misuse detection." Misuse detection is the process of monitoring and reporting unauthorized or inappropriate activity on network computers. For example, Smaha et al., U.S. Pat. No. 5,557,742 (hereinafter referred to as "Smaha") discloses a process for detecting a misuse condition by applying predetermined "misuse signatures" to identify known misuses of networked computers. An example of a misuse signature is four unsuccessful logins on a network computer followed by a successful login (see Smaha column 12, lines 12-13).

Several problems exist, however, with respect to prior misuse detection systems. First and foremost, these systems are overly simplistic in the manner in which they evaluate misuse conditions. For example, these systems simply identify misuse signatures transmitted across the network and generate an alert condition in response. They do not factor in relevant information which would allow a more accurate misuse determination such as, for example, the context in which the data signatures are transmitted, the types of nodes to which the data signatures are directed, and/or the responses of the nodes. As such, these systems are incapable of determining the likelihood that the attempted misuse actually succeeded. Intruder scans and attacks are so numerous on networks exposed to the Internet that distinguishing effective attacks from the background "noise" of the Internet has become extremely difficult, if not impossible.

An additional problem with prior art misuse detection systems is that these systems can only identify activity as being suspicious, but cannot conclusively differentiate among deliberate misuse attempts, accidents (e.g., user enters the wrong password), or normal incidents (e.g., network manager uses pings to monitor network performance). Thus, prior art misuse detection systems record all suspicious events and rely upon the intelligence of the operator to wade through the "false-positives" in order to find salient records.

SUMMARY OF THE INVENTION

A system and method for preventing misuse conditions on a data network are described. Embodiments of the system and method evaluate potential network misuse signatures by analyzing variables such as the state of the network and/or target, the context in which the potential misuse signatures are detected, the response/reaction of the target and/or the fingerprint of the target. These and other variables may be factored in to the misuse determination, either alone, or in combination.

BRIEF DESCRIPTION OF THE DRAWINGS

A better understanding of the present invention can be obtained from the following detailed description in conjunction with the following drawings, in which:

FIG. 4 illustrates exemplary types of contextual data which may be used to evaluate data signatures according to embodiments of the system and method described herein.

FIG. 5 illustrates exemplary fingerprint data requests/transmissions and target responses according to embodiments of the system and method described herein.

FIG. 6 illustrates exemplary target fingerprints and corresponding target vulnerabilities employed in one embodiment of the invention.

FIG. 8 illustrates the operation of the FTP protocol.

FIG. 10 illustrates the difference between a signature created according to the existing art compared with a signature created with one embodiment of the present system.

FIG. 11 illustrates the difference between two signatures of the present system, one where a certain response increases the severity of an event, the other that decreases the severity of a different event based upon the same response.

FIG. 12 illustrates portmap dump information employed by embodiments of the invention.

DETAILED DESCRIPTION

A system and method for preventing misuse conditions on a data network are described below. It should be noted that, in the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

An Exemplary Network Architecture

Figure 1:
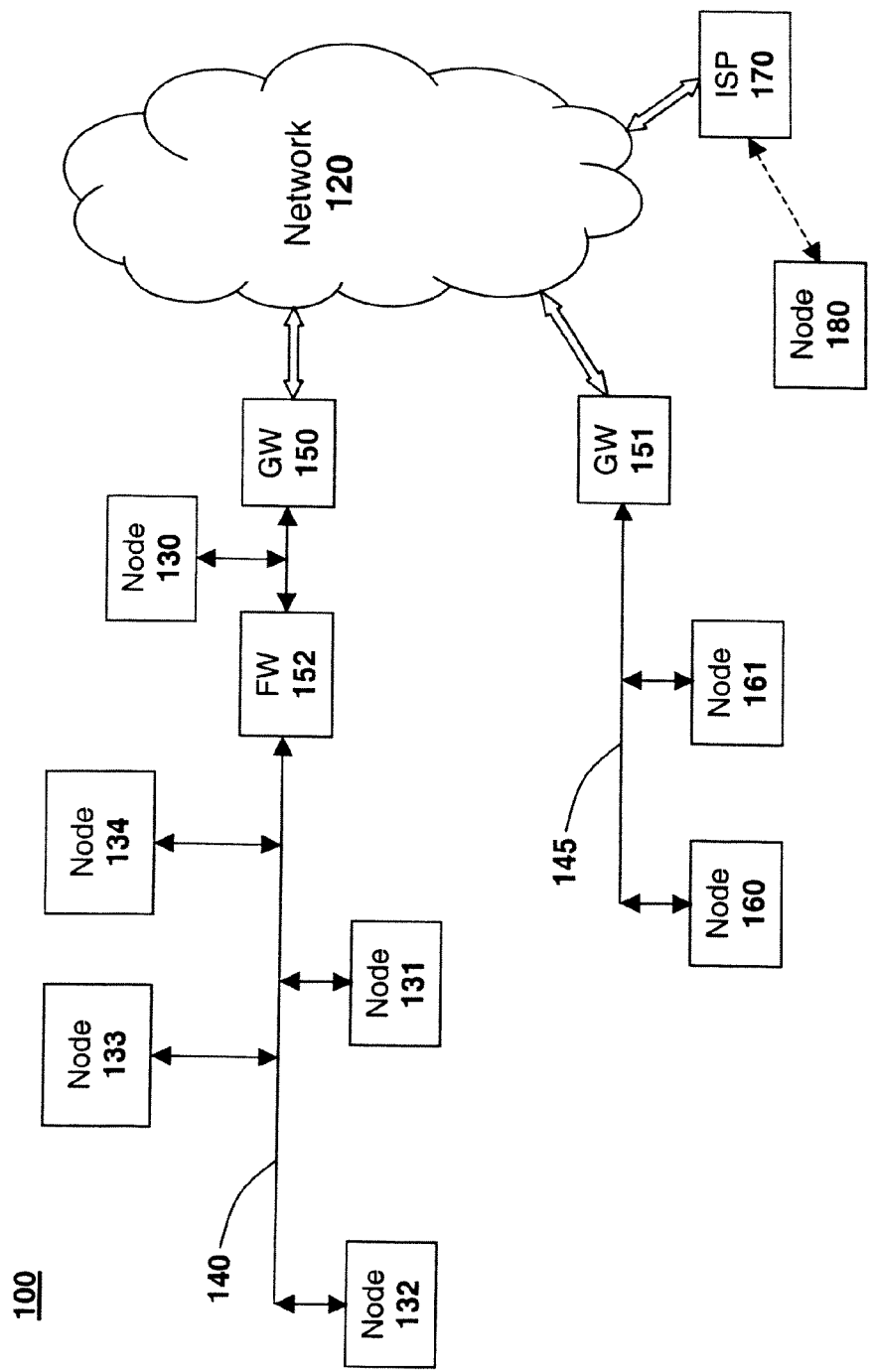
FIG. 1 illustrates an exemplary network architecture on which various features of the system and method are implemented.

Elements of the system and method for preventing network misuse may be included within the network architecture illustrated in FIG. 1. The architecture generally depicts a local area network (hereinafter "LAN") 140 over which a plurality of nodes 130-134 communicate. Nodes 130-134 may be servers, workstations, clients and/or any other types of apparatuses which includes a processor for processing data and a network interface for communicating data across the LAN 140.

The nodes 130-134 communicate over a larger network 120 (e.g., the Internet) through a gateway 150 which, in one embodiment, translates between different network protocols of the LAN 140 and the larger network 120 as required. Also included on the LAN 140 is a firewall 152 used to filter out unwanted data from the portion of the LAN 140 on which a group of the nodes (i.e., nodes 131-134) reside.

A second LAN 145 and a group of nodes 160,161 are also illustrated communicating over the larger network 120 through a second gateway 151. In addition, a node 180 is illustrated communicating over the network 120 by connecting through an Internet Service Provider 150 (hereinafter "ISP"). The node 180 may communicate with the ISP 170 using a variety of different communication channels including, for example, a standard telephone channel, a digital subscriber line ("DSL") channel, or a cable modem channel.

Embodiments of the invention include various steps, which are described below. The steps may be embodied in machine-executable instructions which can be used to cause a general-purpose or special-purpose processor on one or more of the nodes 130-134 to perform certain steps. Alternatively, these steps may be performed by specific hardware components that contain hardwired logic for performing the steps, or by any combination of software, firmware and/or hardware.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnet or optical cards, propagation media or other type of media/machine-readable medium suitable for storing instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Embodiments of the Invention

As used herein, an "incident" or an "event" is the receipt of a suspicious data transmission by a network node hereinafter referred to as the "target node" or "target," originating from another network node, hereinafter referred to as the "suspect node" or "suspect." Certain types of incidents are inherently suspicious from a system security point of view. For example, the pattern "/cgi-bin/phf" directed to a target server may indicate that a hacker is trying to exploit the "phf" Common Gateway Interface ("CGI") script in order to break into the server (the "phf" script was included as a demonstration program with certain server operating systems). Similarly, several successive transmissions of an invalid user ID or password from a suspect node to a target may indicate that an unauthorized user is attempting to gain access to the target. Various other types of suspicious network events are described below.

In one embodiment of the invention, one or more of the nodes—e.g., node 132—monitors network traffic across the LAN 140. When the node 132 identifies an incident directed to a particular client or server—e.g., node 134—it may (or may not) log the incident, generate an alert condition and/or take certain precautionary measures. The type and extent of action taken by the node 132 may depend on a variety of factors including, but not limited to, the type of incident detected; the "type" of target to which the incident is directed (e.g., the processor in the target, version of software running in the target, . . . etc); the response of the target; the firewall response, if any (e.g., whether the incident has been filtered by the firewall), and/or the behavior of the target following the incident. Each of these variables, alone or in combination, may dictate the type and extent of a response.

Other embodiments may consist of software running on the target itself, either within the networking stack or within the process space of the target service.

State-based Protocol Analysis

As described above, prior misuse detection systems listen for "suspicious" data patterns broadcast across the LAN. One embodiment of the present system will instead fully "decode" network traffic.

Figure 9:
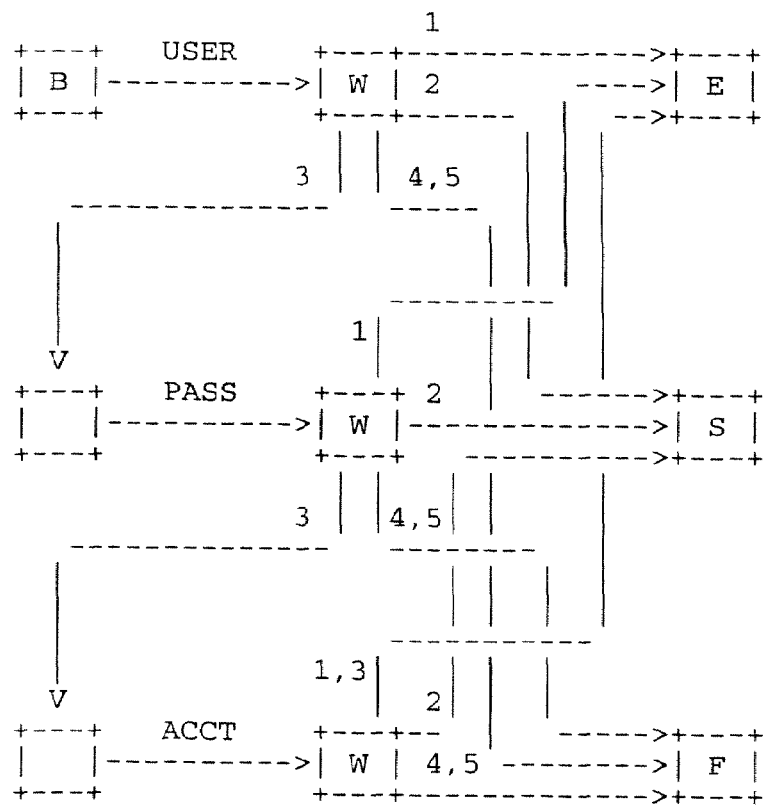
FIG. 9 illustrates part of the state-diagram for the FTP protocol; this is an excerpt from the FTP specification "RFC 959".

Network services are often described through the use of a state machine. For example, before interacting with a service, a user must first login. Described another way, many services start in the "authentication" state before transitioning to the "command" state. An example of state-diagrams for the FTP service can be found in RFC959. See FIG. 9 for an example of the portion of the FTP state-machine responsible for logging on and authenticating.

The prior art of misuse detection systems are generally "stateless." They ignore the state of protocol machine, but instead look for simple patterns or strings. By contrast, embodiments of the invention described herein contain knowledge of the state machine.

FIG. 8 demonstrates the FTP command channel, showing the user requests (prefixed by →) and the server responses. Each request and response has been sent via a different packet across the network. One embodiment of this invention describes a misuse detection system that tracks the state of this protocol machine. Rather than examining each packet blindly for well-known strings, the embodiment tracks both the client and server side remembering what each does.

FIG. 10 shows the difference between a signature written according to the state-of-the-art, and a signature written according to one embodiment of the present invention. Both signatures correctly trigger on the "RETR /etc/passwd" command. However, the first signature simply looks for the patterns "RETR" and "passwd" within a command. As such, this signature will falsely trigger in the FTP session demonstrated in FIG. 8 with the "SYST" command. This signature will not correctly trigger when presented the "RNFR" command.

In contrast, the new signature provides enhanced capability. It looks for the filename "passwd" only within contexts where filenames are likely to appear. It will not trigger on the "SYST" command, because it knows that FTP does not process filenames within that command. It will also correctly trigger on the "RNFR" command, because it knows that filenames appear within that command.

Furthermore, the signature has been programmed to only trigger when the server responds indicating success (in FTP, the command codes between 200 and 399 indicate success). Therefore, the signature will not trigger on the "RETR /tmp/etc/passwd", because it knows that the command failed with a response of 550.

Finally, this signature focuses in on the Washington University variant of FTP servers. It is a popular FTP service included with many popular UNIX systems, and is known to be frequently configured to allow access to the password file. This sample signature using the present system has been programmed to only trigger an alert when this FTP service has been discovered.

Contextual Data Signature Analysis

As described above, prior misuse detection systems listen for "suspicious" data patterns broadcast across the LAN. One embodiment of the present system and method also monitors network traffic for suspicious data signatures. However, referring to FIG. 2, upon detecting a suspicious data signature transmitted from a suspect to a target (at 205), one embodiment of the system also evaluates the context in which the signature is transmitted (at 210). As used herein, a data signature's context includes information related to how the data signature is transmitted such as, for example, the underlying protocol used to transmit the data signature and/or the data field in which the data signature is encapsulated. The system uses contextual information of this sort to evaluate the extent to which the detected data signature poses a threat to the target.

For example, the data signature of a path directed to "/cgi-bin/phf" may indicate that someone is attempting to exploit a particular server by running the "phf" script/program stored on that server. This is a particular concern if the path is embedded in the header of a HyperText Transport Protocol ("HTTP") data transmission (indicating that someone is actually attempting to execute the "phf" program). Accordingly, one embodiment of the system will generate an alert condition only if the path is detected in this context (or will generate a relatively more severe alert condition). By contrast, if the same path is embedded in the header of an email or news message, then it is unlikely that the transmission poses a threat (i.e., because in these contexts the transmission will not execute the "phf" program).

A variety of additional contextual information which may be used to evaluate data signatures is set forth in FIG. 4. It should be noted, however, that the information tabulated in FIG. 4 is merely exemplary and should not be read to limit the underlying principles of the invention.

Figure 2:
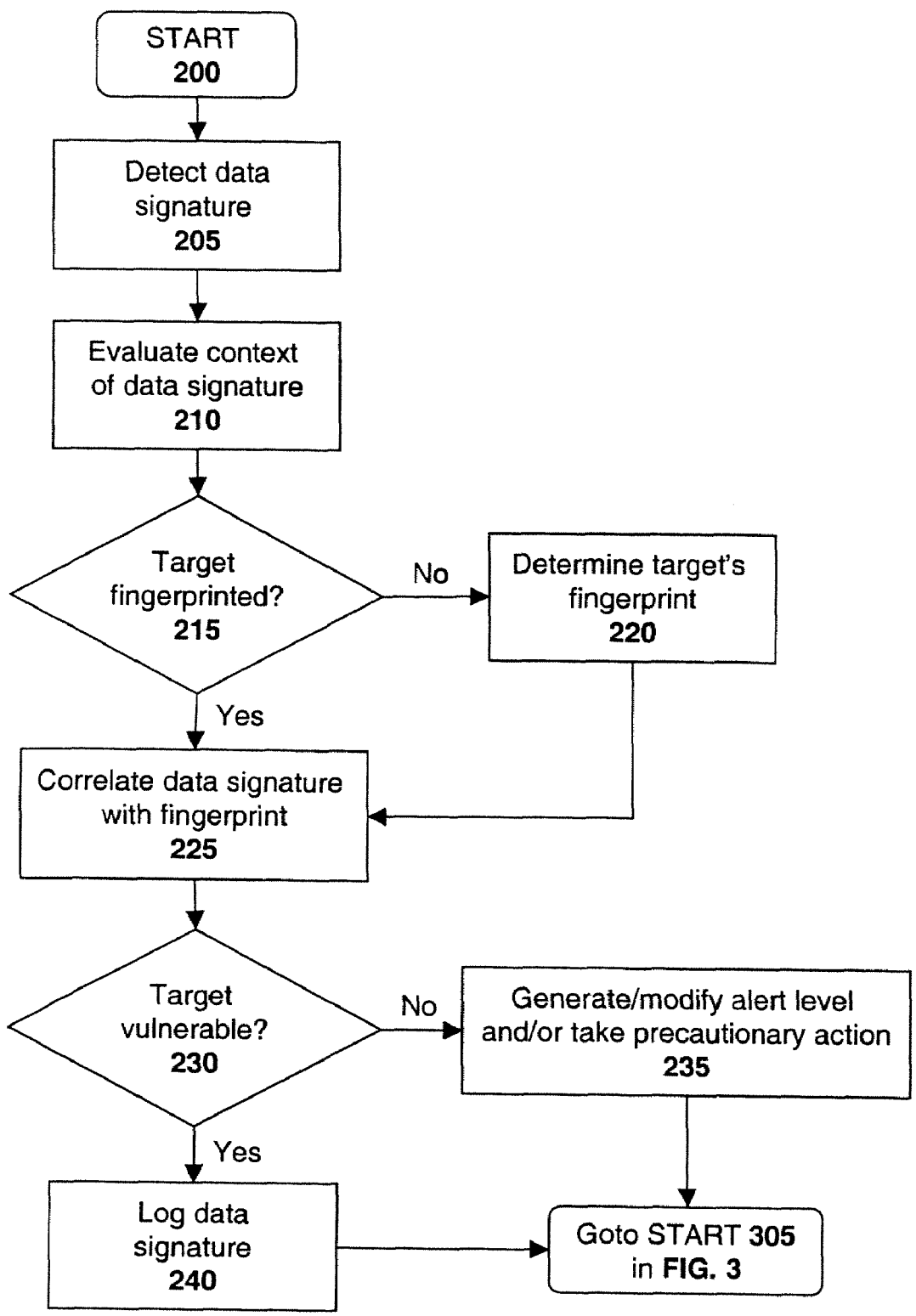
FIG. 2 illustrates embodiments of a process for analyzing and preventing data network misuse.

In addition, although illustrated in FIG. 2 as two independent steps, 205 and 210, one embodiment of the invention simultaneously detects suspicious data signatures and determines the context of the signatures (e.g., via a lookup table which includes both signature and contextual data). In other words, in this embodiment the contextual data may be incorporated into the definition of the "data signature" itself.

Service Fingerprint Analysis

One embodiment of the invention also factors in the "fingerprint" of the target when performing misuse analysis. As used herein a target's "fingerprint" includes the operating system ("OS") and/or the OS version configured on the target; any applications or services running on the target; the basic input/output system ("BIOS") and/or the BIOS version; the processor(s) configured on the target; and/or any other information relating to the software/hardware and/or firmware configured on the target.

This "fingerprint" data may be collected by various embodiments of the system in various ways. In one embodiment, fingerprint data for all (or a select group of) potential targets is manually input by a system operator (e.g., the network administrator). Alternatively, or in addition, one embodiment automatically scans potential targets over the network to acquire relevant fingerprint data (e.g., on a periodic basis and/or upon detecting a suspicious data signature). Alternatively, or in addition, one embodiment passively monitors the behavior of the system (e.g. extracting version information from the banner). Regardless of how the target fingerprint data is collected, the underlying principles of the invention remain the same.

Exemplary fingerprint data requests/transmissions and target responses are illustrated in FIG. 5. In addition to these explicit requests/responses, implicit information about the target may also be collected based on the target's behavior. For example, the nmap port scanning program can determine the target's OS by sending specially constructed packets at the target. While all OSes respond the same to legal input, OSes respond differently to illegal input, allowing nmap to uniquely identify the target OS. A host-based scanner may be employed to query the versions of running services/applications, then upload the database to the IDS. Various additional mechanisms may be employed for collecting target fingerprint data while still complying with the underlying principles of the invention.

The fingerprint not only include simple versioning information, but also information about the features that might be enabled within the target service. FIG. 5 shows an Appache version 1.3.14 server that runs on RedHat Linux, with the mod_ssl version 2.7.1 extension based upon the OpenSSL version 0.9.5a libraries. It also supports a DAV module version 1.0.2 and scripting interface for PHP and PERL (with respective module version numbers). FIG. 12 shows portmap dump information, indicating which versions of software modules are running, as well as allowing a fingerprint of the entire system to be determined.

Regardless of how/when the target fingerprint data is collected (determined at 215 and/or 220 of FIG. 2) one embodiment of the system correlates the fingerprint data with the context-based and/or state-based data signature (as indicated at 255) to determine whether the target is actually vulnerable to the suspicious data signature (at 230). For example, only certain target configurations are vulnerable to the "phf" data signature described above. More specifically, the Apache™ server with a version number below 1.2 is vulnerable to the "phf" attack. Thus, if the target fingerprint indicates Apache version of 1.2.4, then the system may only generate a low-level alert (or no alert) upon detecting the "phf" signature. If, however, the target is running version 1.0 of Apache, then the target is vulnerable and the system may generate a more severe alert condition.

Similarly, the signature "09090909 . . . " is considered a suspicious signature because it represents code used to execute "no-ops" on an Intel™ processor (e.g., a Pentium™-class processor). Although "no-ops" have certain legitimate uses for software developers, they may also be used by intruders to break into and/or disable Intel-based systems under certain circumstances. As such, if the target contains an Intel processor and a "no-op" data signature is identified, then an alert condition may be generated because the target is vulnerable to the "no-op" attack. However, if the target is configured with a non-Intel processor (e.g., a Sun Sparc™ processor), then the target is not vulnerable, and the system may (or may not) merely log the event. One example where the system discovers that the target is using an Intel process is from the Telnet banner shown in FIG. 5.

Certain target fingerprints and corresponding vulnerabilities are set forth in FIG. 6. However, it should be noted that the table in FIG. 6 is not an exhaustive list and is used for the purpose of illustration only. One embodiment of the system maintains a table such as the one in FIG. 6 in memory and references the table to determine whether particular targets are vulnerable to particular data signatures. In this embodiment, the table may be continually updated as new vulnerabilities (or lack thereof become known. The table may include a list of targets which are vulnerable to particular data signatures, targets which are not vulnerable to particular data signatures, or both, depending on the embodiment of the system.

If the system determines that the target is not vulnerable, one embodiment of the system generates a low-level alert and/or simply logs the event signature (or may take no action whatsoever, depending on the configuration). If the system determines that the target is vulnerable, however, then one embodiment will generate an alert condition (or increase a preexisting alert level) and/or may take certain precautionary measures (at 235). For example, at this stage the system may attempt to block incoming data transmissions from the suspect node (e.g., by commanding the firewall to do so).

Target Response Analysis

Figure 3:
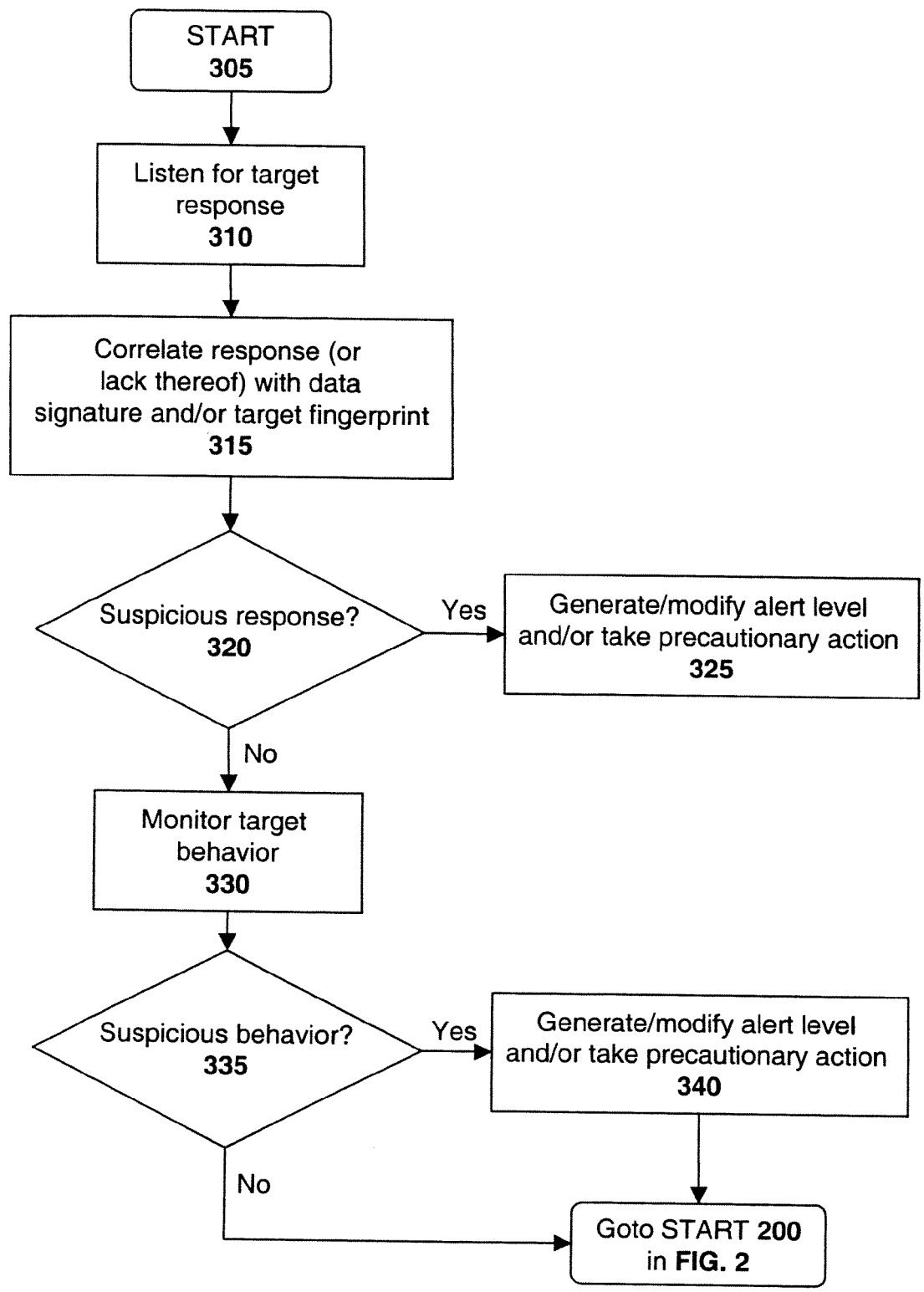
FIG. 3 illustrates additional embodiments of a process for analyzing and preventing data network misuse.

One embodiment of the system factors in the target's response to the detected data signature to further evaluate the probability of network misuse. Thus, referring to FIG. 3, after hearing a suspicious data signature, this embodiment of the system listens for a response from the target at 310. At 315 the system correlates the response with the detected data signature and/or the target fingerprint. If the system determines that the target's response is "suspicious" (at 320) then it may generate/modify an alert level and/or take certain precautionary measures as described above. If the system was already in a state of heightened alert (e.g., based on the data signature and target fingerprint analysis described above) then it may jump to a relatively higher state of alert.

Various types of target responses may be identified as "suspicious." For example, if a request is directed to the target but no response is detected, this may indicate that the target has been disabled due to a Denial-of-Service attack (DoS). Similarly, a connection to the target being closed without a target response and/or the target response being significantly delayed may also indicate that an attack has been made on the target. Non-protocol responses from the target after the attack may indicate that the connection has been transformed from the protocol (such as FTP) into a raw shell (similar to Telnet).

One embodiment of the system allows responses to be coded along with the signature. FIG. 11 illustrates two signatures provided to the system. In the first signature, if the file "system32/cmd.exe" is accessed, a response value of "200" indicates that the attack failed—the example shows that the attack is downgraded (using the minus symbol) if that response code is detected. However, the second signature detects an HTW attack. In this case, a response code of "200" indicates that the attack succeeded (specified using the plus symbol).

The response will appear on the network a long time after the initial request that first triggered the signature. One embodiment will wait until it receives a response (or times out) before generating the alert. Another embodiment will generate an alert immediately upon the initial trigger, then update that alert based upon the additional information as it arrives.

In addition, one embodiment of the system may trigger an alert if a target transmits a response which should never occur during normal protocol operation. One example is the non-protocol response described above. In addition, during a File Transfer Protocol ("FTP") session, if an FTP target generates an "unknown command" response, one embodiment of the system will generate an alert condition because the "unknown command" should never be transmitted by the target during normal operation. In other words, commercially available FTP applications will generally send decipherable FTP commands to the target. If an unknown command is sent, this may indicate that someone is entering FTP commands at a command prompt in an attempt to compromise the target. Rather than triggering on the raw pattern of "unknown command", the embodiment will trigger upon the state indicating that the command was unknown: the alert will include the information as to which command was unknown that was remembered from the request.

One embodiment of the invention will not simply evaluate the target's response alone but, rather, will evaluate the target's response in light of the data signature sent to the target. For example, one type of suspicious data signature is referred to as a "buffer overflow" attack/signature. A target which permits user logins will typically allocate a predetermined amount of memory for a user name and/or password to be transmitted from the user (e.g., a data field of 100 characters in length). Computer hackers may attempt to exploit a target by transmitting executable code to the target in response to the user ID and/or password. The computer hacker may attach the executable code to the data transmission such that it resides outside of the allocated data field (resulting in the "buffer overflow" condition). Once inside the target, the executable code will then execute in an undefined space in memory (i.e., outside of the pre-allocated memory space) where it can perform a variety of harmful transactions including crashing the target. Thus, in one embodiment of the system, if a buffer overflow condition is detected (i.e., more data is transmitted to the target in response to the user ID prompt than is allocated) then the system may generate a first alert condition and/or monitor the target's response. If the target's response is delayed or if the target does not respond, then this is a strong indication that the target has been compromised and the system may generate a heightened alert condition. Various other target responses may be correlated with various known data signatures to determine whether, and to what extent, the target has been compromised.

Subsequent Target Behavior Analysis

Referring once again to FIG. 3, one embodiment of the system will continue to monitor target behavior (at 330) regardless of whether the target's initial response was suspicious (determined at 320). Various types of target behaviors are considered "suspicious," particularly when preceded by a suspicious incoming data signature. More particularly, if a target transmits certain types of character strings to a suspect node, this may indicate that the suspect has gained access to restricted areas of the target.

In addition to the examples set forth above, a root shell prompt, such as the character "#" for UNIX systems, indicates that a user at the suspect node has gained full access to system resources and therefore has the ability to add/delete virtually anything from the target's hard drive (a normal prompt in UNIX is identified by a different character such as "$" or "%"). When one embodiment of the system detects the root shell transmitted to a suspect node under normal conditions, it may not immediately generate an alert condition (e.g., it may simply log the event), because the user at the target may legitimately have authority to use the root shell prompt (e.g., a network administrator). If, however, the system detects or has previously detected a suspicious condition related to the suspect or the target (e.g., the "buffer overflow" data signature from the suspect followed by a long delay from the target) then the system may generate an alert condition and/or may take certain precautionary measures (at 340).

Numerous other suspicious target behaviors exist including, for example, a transmission of the Windows™/DOS™ command prompt to a suspect and/or transmitting known root-kit protocols used by computer hackers such as LOKI, TFN and/or Trin000, all of which may indicate that a hacker is attempting to gain unauthorized access to the target. The string "command not found" indicates the potentially suspicious event that somebody attempted an action that was denied, but since users mistype commands so frequently it is never logged. However, if the system has been placed into heightened awareness because of a buffer-overflow was detected, this might indicate that the intruder has successfully obtained a command shell to the system and is exploring the system.

Specific Protocol Examples

Many Internet protocols are based upon a text-based system. Each command is specified on a single line, then a line comes back with the response. Responses come back as lines of text. A command is of the form "CMD parameters," where "CMD" is a short string indicative of the command, and the parameters are additional information for that command. A response line contains a 3-digit numeric code, where the first digit ranges from 1-5, where 1=preliminary, 2=success, 3=intermediate, 4=failure, 5=major-failure. The additional content on the response line is usually intended only for human readable purposes, though sometimes it has machine parseable content.

Example from some Protocols are:
NNTP—Network News Transport Protocol
→ARTICLE 401
423 No such article in this newsgroup The client attempts to retrieve article numbered 401, but is denied because it doesn't exist.
POP3—Post Office Protocol version 3
→DELE 1
+OK message 1 deleted User deletes message number 1 successfully (POP3 diverges because it does not have numeric response codes).
SMTP—Simple Mail Transfer Protocol
→RCPT TO:<patent@robertgraham.com>
250<patent@robertgraham.com>. . . Recipient ok The client tells the e-mail server where the e-mail is destined. The server respond back saying that the address is acceptable.
FTP—File Transfer Protocol
→PASV
227 Entering Passive Mode. 192,168,1,202,4,1

The client tells the FTP server to prepare for receiving a file, the server responds with an indication that the file should be send to it on port 1025.

These protocols can be modeled with a common signature system, whereby a signature is specified to include:

<protocol> <command-name> <pattern> <[+/−] response-code> <[+/−] behavior> <[+/−] fingerprint> <reaction>

A signature doesn't have to have all these components, but one which includes everything might look like:
FTP.PASV   "*192,168,1,201*"+"2??"+slow
−"*Microsoft*"log>3

The above signature would tell the FTP parser to examine FTP traffic for the PASV command. When it sees the regular-expression, it should trigger an alert. The alert's severity should be raised if the response code is of the 200-class and if the connections seem slow to respond. However, the severity should be downgraded if it is a Microsoft FTP service. If the severity exceeds a threshold of 3, then the action should be to log all further traffic across the connections between the machines for a period of time.

Protocols based upon the Sun RPC (Remote Procedure Call) system might have a different style of signatures specified. In order to specify a unique operation, a unique program number, version number, and procedure call must be specified. The content of RPC data is highly structured according to XDR (External Data Representation) rules. Therefore, rather than a simple pattern or regular expression, the signature can specify context for the signature according to XDR guidelines. Response codes can vary from underlying transport events (e.g., connection terminated), to RPC events (e.g., unknown procedure number), to high-level XDR encoded events dependent upon the exact signature.

There is a vulnerability within the rpc.ypasswd subsystem on certain systems whereby a long username could be specified on a password "update." The update structure looks like the following:

```
struct yppasswd {
    string oldpass<>;
    string pw_name<>;
    string pw_passwd<>;
    int pw_uid;
    int pw_gid;
    string pw_gecos<>;
    string pw_dir<>;
    string pw_shell<>;
};
FTP.PASV "*192,168,1,201*" +"2??" +slow -"*Microsoft*" log>3
RPC. 100009.1.1 [ S[ ] S[len>213] S[ ] I[ ] I[ ] S[ ] S[ ]
S[ ] ] -RPC=0/-PROG=I[ ] -
NOPROG/+SPARC/+Solaris/-Linux/-FreeBSD
```

This signature is interpreted as:

Evaluate with signature within the context of RPC, program=100009 (YPPASSWD), version=1, procedure=1 (UPDATE)

Read in the input, which is of the form of three XDR strings, two integers, and three more strings.

Trigger when the second string, the pw_name field, is longer than 213-bytes.

We expect the service to crash at this point, so if we get back a legal RPC response saying the command was sent, or a legal YPPASSWD response containing a single XDR integer field (the "status" field), then we know the attack failed. We should therefore reduce the severity of the alert.

Typical exploits in the real world affect Sun Solaris machines running on SPARC CPUs. Therefore, if the background fingerprint information indicates these conditions, then we should raise the severity of the alert. We also know of some broken scripts used by hackers against Linux and FreeBSD machines, so if YPPASSWD services are attacked on these machines, then we should lower the severity of the alert. The "NOPROG" code is described below.

Note that in the above signature it is assumed that the fingerprinting information comes from the RPC subsystem. One mechanism is to execute a portmap dump listing all the services. For example, FIG. 12 contains three tables showing the portmap dump output for RedHat 6.2 Linux, RedHat 7.0 Linux, and Solaris 8. The values are typical of each of these system versions. A portmap dump of a new system will likely contain the same versions of software as a system showing a similar dump.

Also note that the RPC fingerprinting process discovers the likelihood that the service is running at all. As you can see in these portmap dump examples, the yppasswd daemon hasn't been registered is unlikely to be running. This means that if the "NOPROG" code is specified as part of the fingerprint rule, then attacks against non-existent services can have their severities downgraded.

It should be noted that the foregoing examples of system operation were for the purpose of illustration only. The contextual, state-based signature analysis and platform fingerprinting just described may be employed using various other protocols and platforms while still complying with the underlying principles of the invention.

Firewall Analysis

One embodiment of the system and method will also evaluate whether a firewall is configured to block certain suspicious data signatures before raising an alert and/or taking action in response to those signatures. For example, referring again to FIG. 1, node 130 may be configured to scan for suspicious network traffic (as described above) and may work with the firewall 152 to filter out suspicious data. If node 130 knows that firewall 152 is already configured to screen out "phf" data signatures (described above), for example, then node 130 may not even generate an alert condition upon sensing a "phf" signature.

Alternatively, of in addition, node 130 may communicate with and/or control firewall 152. In this embodiment, once a particular alert threshold has been reached (e.g., there is a high probability that a suspect has gained unauthorized access to the system), node 130 may control the firewall 152 to filter out those data signatures causing the heightened alert threshold.

Although illustrated in FIG. 1 as separate devices, in one embodiment, node 130 (or other node(s) on which elements of the system are implemented) and firewall 152 are comprised of a single device (i.e., a computer) which performs the functions of both (e.g., detecting data signatures, raising alert levels, blocking certain traffic . . . etc). In addition, one embodiment of the system is incorporated on all, or a select group of, nodes throughout the LAN 140. For example, one embodiment may be installed and executed on all servers and/or workstations on the LAN 140 to monitor all incoming and outgoing workstation/server traffic.

State-Based Detection and Prevention

Any of the foregoing variables—data signature, data signature context, target fingerprint, target response, target behavior and/or firewall response—alone or in combination may be evaluated by embodiments of the invention to modify an alert level. Thus, the alert level of one embodiment is a stateful value which may be driven up or down as new information is acquired with respect to the foregoing variables or other system variables. Moreover the alert level may be a network-wide alert level, a target-specific alert level and/or a suspect-specific alert level.

Embodiments of the invention may also employ features disclosed in the co-pending application entitled "A Method and Apparatus for Providing Network and Computer System Security" (Ser. No. 09/477,500, filed Nov. 23, 1999), which is assigned to the assignee of the present application and which is incorporated herein by reference. The foregoing application discloses a system and method in which a particular type of stateful alert level, referred to as an "aggravation level," is modified based on suspicious network activity. Thus, a target's aggravation level may initially increase upon detecting a suspicious data signature transmitted from a suspect (e.g., based on signature and/or signature context as described above); it may increase further if, based on an analysis of the target's fingerprint, the target is vulnerable to the data signature; finally, it may rise even higher if the target's response or other subsequent behavior is "suspicious" in some way.

Figure 7:
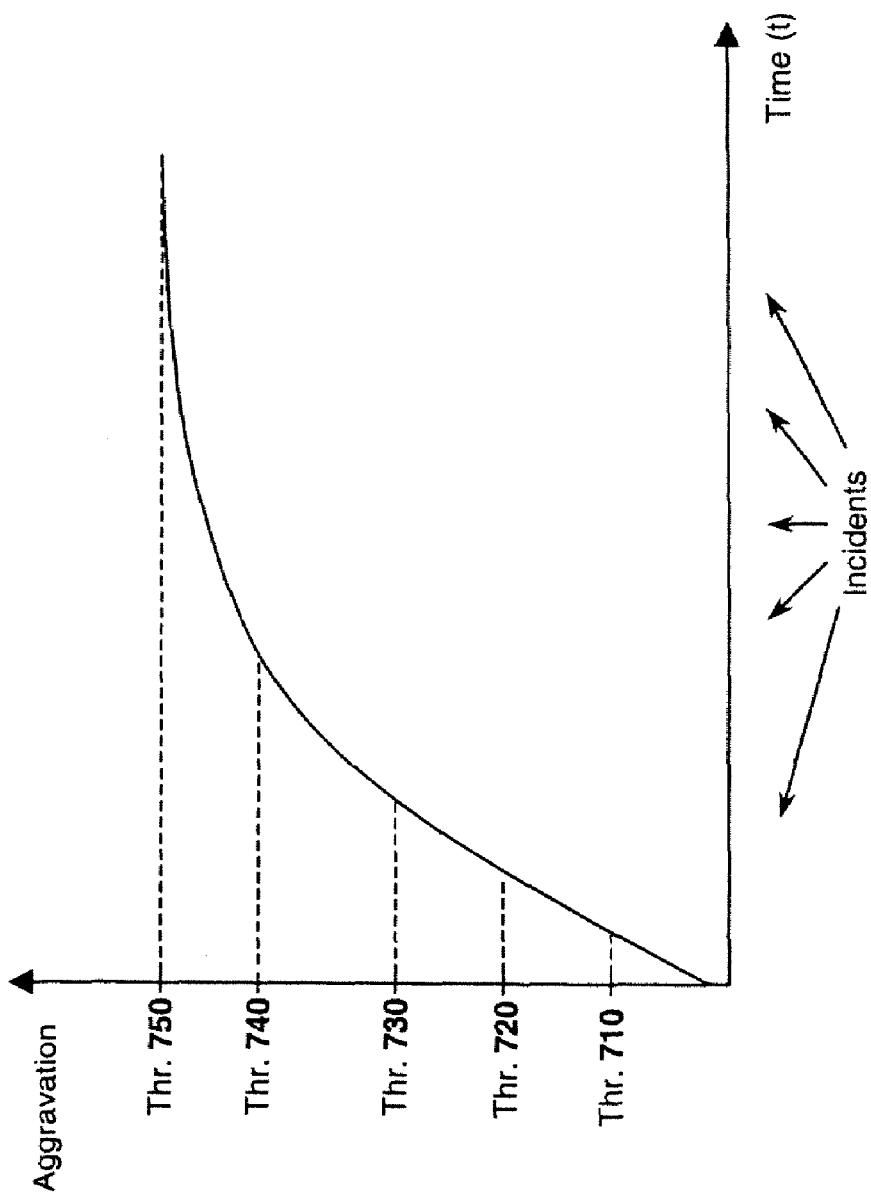
FIG. 7 illustrates the relationship between an aggravation level and a series of incidents according to one embodiment of the invention.

As the aggravation level of the target increases in this manner, it may pass through thresholds triggering various system responses, including passive scanning of the suspect, active scanning of the suspect, and/or blocking incoming data transmitted from the suspect. More specifically, one particular embodiment will now be described with respect to FIG. 7. As the aggravation level increases, as shown in curve 710, a first aggravation threshold reached is threshold 710. In one embodiment, at threshold 710 the target begins a passive scan on all incoming incidents. For example, the target may begin recording concurrent incoming incidents in an incident log file so that the full extent of the intrusion can be identified. Examples of incidents include web server "hits" (file access), mail commands, port scans, and pings from the suspect(s) to the target.

At the next aggravation threshold, threshold 720, the target of one embodiment will begin actively scanning the suspect nodes causing the incidents, in an attempt to acquire identification information about the suspect nodes. One example of an active scan is the "finger" command. The finger command returns, among other information, the suspect nodes' network addresses and the identity of the users who are currently logged in to the suspect nodes. At this aggravation threshold, the target may also increase its passive scanning for new incidents. Thus, at aggravation threshold 720, the target may begin to actively acquire information about the suspects and also may increase the logging associated with new incidents.

As the target continues to receive suspicious data signatures from one or more suspects (e.g., invalid logins), and/or correlates the suspicious data signatures with additional information (e.g., the target's fingerprint, the target's response . . . etc) its aggravation level reaches threshold 730. Here, the target of one embodiment begins a more aggressive active scan of the suspects. For example, using the "traceroute" command the target may attempt to ascertain the complete network route taken by data originating form the suspect. In addition, the target may query the suspect's local gateway for the suspect's data link address (a.k.a. media access control address) using the Simple Network Management Protocol ("SNMP"). More specifically, identification via SNMP can consist of a "get-next" sweep of the table of the ifEntry field (usually, one entry per interface).

As the target's aggravation reaches threshold 440, the target in one embodiment will take additional steps to ensure that an unauthorized suspect is not provided with access to its resources. At this threshold the target may require additional authentication information from suspects before providing the suspects with access. For example, even if a suspect transmits correct login information (i.e. the correct user ID and password) to the target, the target may initially return an "invalid login" response back to the suspect. Only if the suspect once again transmits the correct login information will the target provide the suspect access. By forcing a double logon in this manner, the target will prevent suspects from acquiring unauthorized access by using automated login scripts, i.e., scripts which run through a series of user ID's and/or passwords in an attempt to determine a valid combination.

At its highest aggravation threshold of this embodiment, threshold 750, the target has received numerous suspicious signatures and/or has correlated the signatures with a variety of network/target information to determine that there is an unreasonably high probability that an unauthorized suspect may gain access to its resources. Therefore, at this aggravation level the target may take the final step of blocking incoming incidents (e.g., from every one, from everyone outside its LAN, from a given set of suspects, etc.), thereby denying access to its resources. The target may also decide to take active scanning measures beyond simple identification, such as sending a "ping-of-death" in an attempt to shut down the suspect(s).

In addition to maintaining an aggravation level for each individual target on the network, an aggravation level may also be maintained for the entire network ("network aggravation level"). The network aggravation level may be calculated by simply averaging the individual target aggravation levels. Alternatively, it may bear some other mathematical relationship with the target aggravation levels. In addition, in one embodiment each target maintains a unique aggravation level for each suspect node with which it communicates ("suspect-specific aggravation"). It should be noted that various types of defined aggravation levels may be employed without departing from the underlying principles of the invention.

Throughout the foregoing description, for the purposes of explanation, numerous specific details were set forth in order to provide a thorough understanding of the invention. For example, the "phf" data signature was described in detail to illustrate particular embodiments of the system and method. It will be apparent, however, to one skilled in the art that the invention may be practiced without some of these specific details. Various well known and yet unknown data signatures, data signature contexts, fingerprint data, and target responses may be used within the system and method described herein. Accordingly, the scope and spirit of the invention should be judged in terms of the claims which follow.

What is claimed is:

1. A computer-implemented method comprising:
   identifying a plurality of data signatures relevant to computer security;
   designating an alert condition value for each data signature based on each data signature itself and contextual information associated with a respective data signature, each alert condition value comprising a ranked value that is unique to each combination of data signature and contextual information associated with a particular data signature, the contextual information comprising at least one of an application layer data field type used to encapsulate the data signature and an application layer protocol type used to transmit the data signature, the alert condition value indicating a security risk level relative to different data signatures and relative to other identical data signatures associated with different contextual information; and
   creating a table comprising the contextual information, the data signatures, and the alert condition values.

2. The method of claim 1, further comprising detecting a data signature by evaluating communications at an application layer level between a target and a suspect.

3. The method of claim 1, further comprising correlating a detected data signature with an application layer fingerprint of a target to determine to what extent the target is vulnerable to said detected data signature.

4. The method of claim 1, further comprising evaluating contextual information related to a detected data signature by comparing the contextual information and the detected data signature to the table in order to determine a likelihood that a target is under an attack.

5. The method of claim 1, further comprising assigning an alert condition value to a detected data signature based on a comparison of contextual information and the detected data signature to data in the table.

6. The method of claim 3, wherein said fingerprint includes an operating system version of said target.

7. The method of claim 3, wherein said fingerprint includes a processor type of said target.

8. The method of claim 1, further comprising generating an alert condition upon determining a target is vulnerable to a detected data signature.

9. The method as in claim 1, further comprising listening for a response from a target in response to a detected data signature.

10. A computer-implemented method comprising:
designating an alert condition value for each of a plurality of data signatures based on each data signature itself and contextual information associated with a particular data signature, each alert condition value comprising a ranked value that is unique to each combination of data signature and contextual information associated with a particular data signature, the contextual information comprising at least one of an application layer data field type used to encapsulate the data signature and an application layer protocol type used to transmit the data signature, the alert condition value indicating a security risk level relative to different data signatures and relative to other identical data signatures associated with different contextual information; and
creating a table comprising the columns of data signatures, contextual information, and alert condition values.

11. The method of claim 10, further comprising identifying a data signature encapsulated in an application layer data field and directed at a target using an application layer protocol.

12. The method of claim 10, further comprising evaluating a context of a detected data signature by one of reviewing the application layer data field type and reviewing an application layer protocol type.

13. The method of claim 10, further comprising comparing context of a detected data signature to the table.

14. The method of claim 10, further comprising determining whether a detected data signature poses a threat based on an assessed context of said detected data signature relative to the table.

15. The method of claim 10, further comprising assigning an alert condition value to a detected data signature based on a comparison of its context to data in the table.

16. The method of claim 10, further comprising identifying the plurality of data signatures relevant to computer security.

17. A machine-readable physical medium having program code stored thereon which, when executed by a machine, causes said machine to perform the operations of:
designating a relative alert condition value to each data signature of a plurality of data signatures based on each data signature itself and contextual information associated with a respective data signature, each alert condition value comprising a ranked value that is unique to each combination of data signature and contextual information associated with a particular data signature, the contextual information comprising at least one of an application layer data field type used to encapsulate the data signature and an application layer protocol type used to transmit the data signature, the relative alert condition value indicating a security risk level relative to different data signatures and relative to other identical data signatures associated with different contextual information;
creating a table comprising the contextual information, the data signatures, and the relative alert condition values; and
evaluating contextual information related to a detected data signature by comparing contextual information associated with the detected data signature to the table in order to determine a likelihood that a target is under attack.

18. The machine-readable physical medium of claim 17, further comprising program code to cause said machine to perform the operations of: assigning a relative alert condition value to the detected data signature based on the evaluation of the contextual information.

19. The machine-readable physical medium of claim 17, further comprising program code to cause said machine to perform the operations of: correlating said detected data signature with a fingerprint of the target to determine to what extent said target is vulnerable to said data signature.

20. The machine-readable physical medium of claim 17, further comprising program code to cause said machine to perform the operations of: evaluating a context of the detected data signature by one of reviewing the application layer data field type and reviewing the application layer protocol type.

* * * * *